(12) United States Patent
Atkinson et al.

(10) Patent No.: US 6,823,302 B1  
(45) Date of Patent: Nov. 23, 2004

(54) REAL-TIME QUALITY ANALYZER FOR VOICE AND AUDIO SIGNALS

(75) Inventors: Ian Atkinson, Union City, CA (US); Martin Lee, Hayward, CA (US); Wei Ma, Castro Valley, CA (US); Kambiz Homayounfar, Tokyo (JP)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/744,423

(22) PCT Filed: May 25, 1999

(86) PCT No.: PCT/US99/11473

§ 371 (c)(1),  
(2), (4) Date: Jan. 24, 2001

(87) PCT Pub. No.: WO00/72306

PCT Pub. Date: Nov. 30, 2000

(51) Int. Cl.[7] .............................................. G10L 21/00
(52) U.S. Cl. .................... 704/216; 704/200.1; 379/1.02; 379/27.03
(58) Field of Search ............................. 704/200, 201.1, 704/216, 217, 218, 221, 224, 234, 237, 239; 379/1.01, 1.02, 10.01, 21, 27.02, 27.03, 27.04

(56) References Cited

U.S. PATENT DOCUMENTS 5,633,909 A   5/1997   Fitch  
5,805,646 A   9/1998   Wang  
5,809,108 A   9/1998   Thompson et al.

OTHER PUBLICATIONS

International Search Report, PCT/US99/11473.  
Dimolitsas.S. Objective speech distortion measures and their relevance to speech quality assessments, IIE Proceedings, vol. 136, Pt. 1, No. 5, Oct. 1989.  
Tallak, S. et al. Time delay estimation for objective quality evaluation of low bit–rate coded speech with noisy channel conditions, Signals, Systems and Computers 1993, IEEE, Nov. 3, 1993.

*Primary Examiner*—Richemond Dorvil  
*Assistant Examiner*—Abul K. Azad  
(74) *Attorney, Agent, or Firm*—Armstrong Teasdale LLP

(57) ABSTRACT

A method for providing real-time perceptual quality measurements of an audio signal (12) in which a quality test signal, including an audio test signal, is received by equipment under test. Playback of a pre-stored representation of the audio signal is coarsely synchronized (20) to the received audio test signal, for example, utilizing a synchronizing pulse in a header of the quality test signal. The playback is then finely synchronized (24) to the received audio signal, for example, by comparing data in a windowed portion of the received audio test signal and a windowed portion of the pre-stored representation of the audio test signal and by adjusting a windowed portion of the pre-stored representation of the audio test signal in accordance with results of the comparison. A window of the received audio test singal is then compared (14) to a portion of the finely synchronized play back of the pre-stored representation of the audio test signal to output a quality measurement of the received audio test signal.

32 Claims, 6 Drawing Sheets

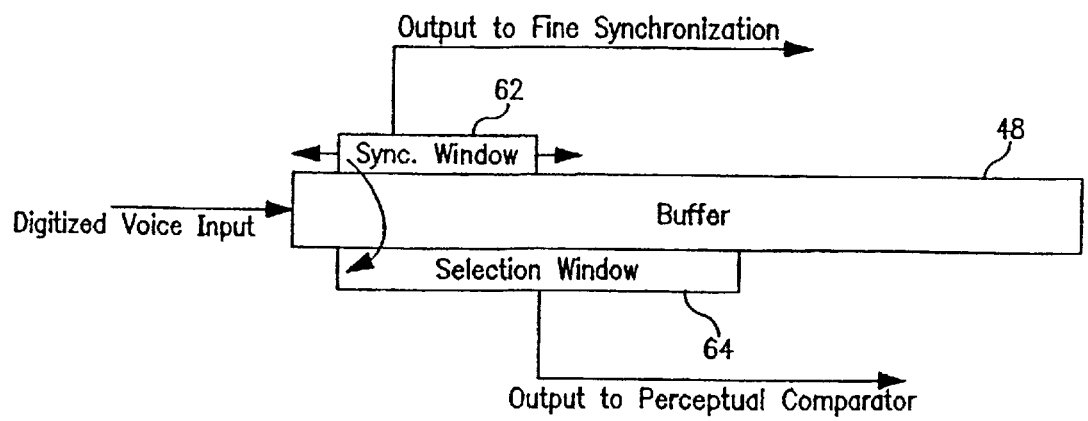
FIG. 4
Rectangular   FIG. 5
Nonlinear Emphasized   FIG. 6
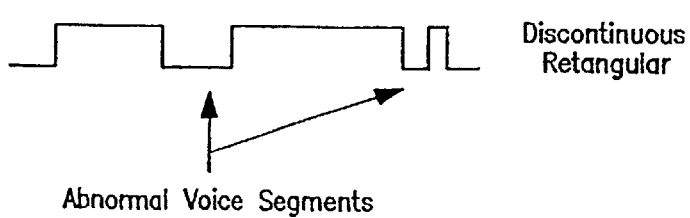
Discontinuous Retangular   FIG. 7
Abnormal Voice Segments

REAL-TIME QUALITY ANALYZER FOR VOICE AND AUDIO SIGNALS

BACKGROUND OF THE INVENTION

This invention relates to methods and apparatus for providing quality measurements for voice equipment under test, and more particularly to methods and apparatus for providing real-time objective perceptual quality measurements of voice or audio signals received by such equipment.

Voice quality evaluation is a difficult task for speech systems, especially those involving compression and coding, because common waveform and spectrum similarity criterion do not correlate particularly well with perceived quality of received voice signals. Formerly, voice quality evaluation of telecommunication systems have been measured off-line using formal perceptual listening tests that are performed in a carefully controlled environment, using pre-prepared voice material. Although this practice is effective, it is both costly and time consuming. In addition, results obtained from such tests are dependent upon the individual test subjects and their environment. As a result, findings from such tests are not always repeatable or consistent.

Recent research in the field of psycho-acoustics has led to a better understanding of how human beings perceive voice and sounds. By applying some of the findings of this field, such as critical band theory, auditory masking, and perceptual loudness, etc., it is now possible to develop "objective" speech measures that closely match results of formal subjective listening tests. Various organizations, including, for example, the International Telecommunications Union (ITU), have developed algorithms to measure voice quality off-line using files stored in a computer. Examples of known objective measurement algorithms are Perceptual Speech Quality Measure (PSQM), Measuring Normalizing Blocks (MNB), Perceptual Analysis Measurement System (PAMS), and Modified Bark Spectral Distortion (MBSD) measure. The latter measurement, for example, splits frequencies into bands that reflect human auditory reception.

Known objective perceptual quality measurement systems require measurement of voice quality to be done off-line, i.e., from stored, received voice data. It would be desirable if such objective perceptual quality measurements could be made in real time or near real time in operational equipment.

BRIEF DESCRIPTION OF THE INVENTION

The present invention, in one aspect, is a method for providing real-time perceptual quality measurements of an audio signal. A quality test signal, including an audio test signal, is received by equipment under test. Playback of a pre-stored representation of the audio signal is coarsely synchronized to the received audio test signal, for example, utilizing a synchronizing pulse in a header of the quality test signal. The playback is then finely synchronized to the received audio signal, for example, by comparing data in a windowed portion of the received audio test signal and a windowed portion of the pre-stored representation of the audio test signal and by adjusting a windowed portion of the pre-stored representation of the audio test signal in accordance with results of the comparison. A window of the received audio test signal is then compared to a portion of the finely synchronized playback of the pre-stored representation of the audio test signal to output a quality measurement of the received audio test signal.

In another aspect, the invention comprises an audio quality analyzer (AQA) to evaluate quality of a quality test signal received by equipment under test, where the quality test signal includes an audio test signal. The AQA is configured to coarsely synchronize playback of a pre-stored representation of the audio test signal to the received audio test signal, to finely synchronize playback of said pre-stored representation of the audio test signal to the received audio test signal and to compare a window of the received audio test signal to a portion of the finely synchronized playback of the pre-stored representation of the audio test signal to output a quality measurement of the received audio test signal.

Accordingly, it will be seen that the invention provides objective perceptual quality measurements of audio and voice signals in real time or near real time in operational equipment.

BRIEF DESCRIPTION OF THE DRAWINGS

FIG. 4 is a block diagram of an embodiment of buffer providing sync windowing and selection windowing in accordance with the invention.

FIG. 5 is a drawing representing a rectangular window function shape.

FIG. 6 is a drawing representing a nonlinear emphasized window function shape.

FIG. 7 is a drawing representing a discontinuous rectangular window function.

DETAILED DESCRIPTION OF THE INVENTION

Figure 1:
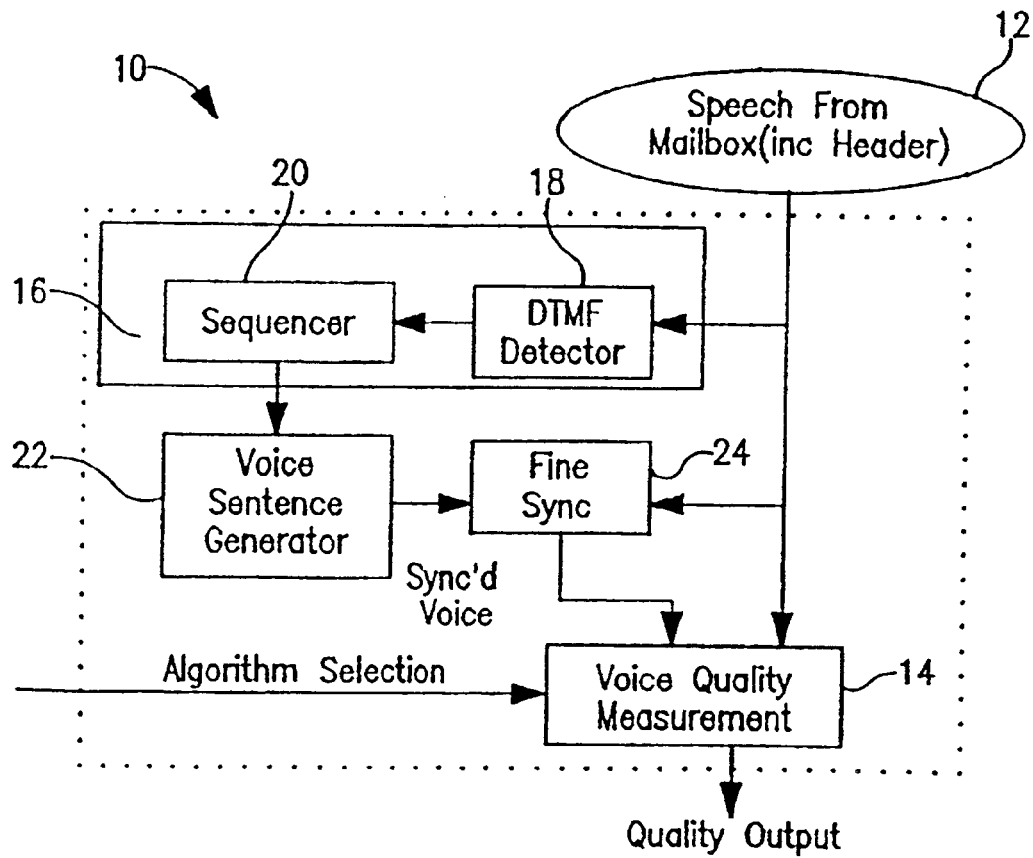
FIG. 1 is a block diagram of an embodiment of a voice quality analyzer in accordance with the invention.

FIG. 1 is a block diagram of a voice quality analyzer (VQA) 10 that receives a voice signal output by voice equipment under test (VEUT) 12. VQA comprises a quality evaluator 14 that generates a quality measurement of voice test signals received from VEUT 12. VQA 10 also comprises a header detector 16 which, in turn, comprises a dual tone multiple frequency (DTMF) detector 18 and a sequencer 20. DTMF detector 18 monitors signals received from VEUT 12 to detect and decode signaling tones present in the received signals. The decoded signals are used by sequencer 20 to control operation of a voice sentence generator 22.

Pre-stored representations of voice test signals are stored in voice sentence generator 22. Such "sentences" may, but do not necessarily represent full sentences or words in any particular language, nor do they necessarily represent speech from any particular human. Rather, the representations are selected for facilitating the voice quality measurement performed by quality evaluator 14. When a header signal preceding a voice test signal is received, sequencer 20 initiates playback of a particular pre-stored voice test signal representation from voice sentence generator 22, depending upon a particular voice test signal that is identified in the header. To achieve synchronization between the pre-stored representation of a voice test signal and the received voice test signal sufficient to perform an objective perceptual quality comparison utilizing quality evaluator 14, a fine synchronizer 24 is provided. Voice quality measurement is performed by applying an objective perceptual quality measurement algorithm to compare the a portion of the synchronized, locally generated reference signal from fine synchronizer 24 to a windowed portion of the signal received from VEUT 12. In one embodiment, one of the following algorithms is used: Perceptual Speech Quality Measure (PSQM), Measuring Normalizing Blocks (MNB), Perceptual Analysis Measurement System (PAMS), and Modified Bark Spectral Distortion (MBSD) measure. In another embodiment, a plurality of different algorithms is available, and an algorithm selection is made manually. In another embodiment (not shown), a plurality of different algorithms are available, and a selection is made dependent upon which pre-stored representation in voice sentence generator 22 is selected by sequencer 20.

Figure 2:
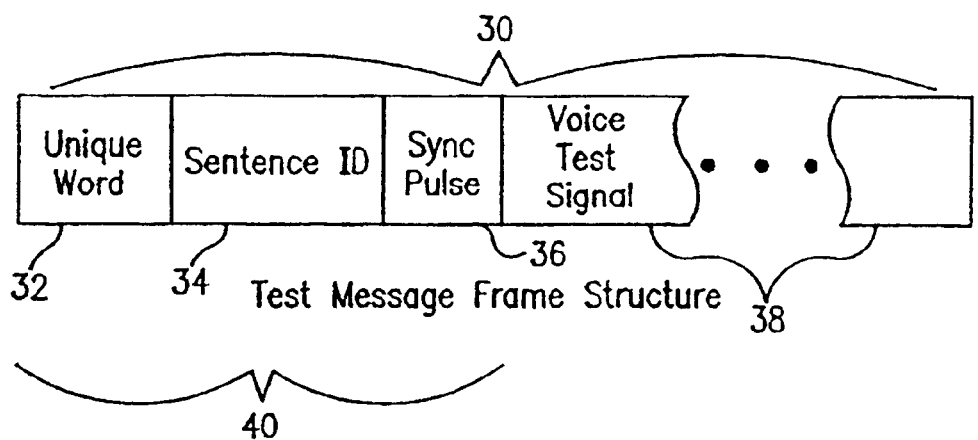
FIG. 2 is a diagram of a quality test message frame.

In one embodiment and referring to FIG. 2, an example of a quality test message 30 is shown. Quality test message 30 includes four sections 32, 34, 36, 38, of which three, 32, 34, and 36, comprise a header 40 that is transmitted utilizing DTMF signaling, and a fourth includes a voice test message 38. Unique word 32 is used to signal the start of a new quality test message 30. Unique word 32 is included to prevent false measurement start signals during periods of severe channel degradation, for example, periods of very noisy reception by VEUT 12 of signals from a cellular network. Sentence ID 34 includes an index number or identifier of voice test message 38, thereby permitting different test messages to be transmitted to VEUT 12 and identified by VQA 10. Sync pulse 36 is a short DTMF pulse that is used to signal the start of voice test signal 38. Sync pulse 36 is used by sequencer 20 to start voice sentence generator 22 playing the appropriate pre-stored voice test signal representation for comparison with that received by VEUT 12. In other embodiments, header 40 is transmitted in another manner, for example, using another form of in-band signaling, or by using out-of-band signaling. In these other embodiments, means other than DTMF detector 18 are used to detect and respond to header 40. Examples of suitable in-band signaling include monotone signaling and telephony data protocol. An example of suitable out-of-band signaling is signaling on a separate paging channel.

Figure 3:
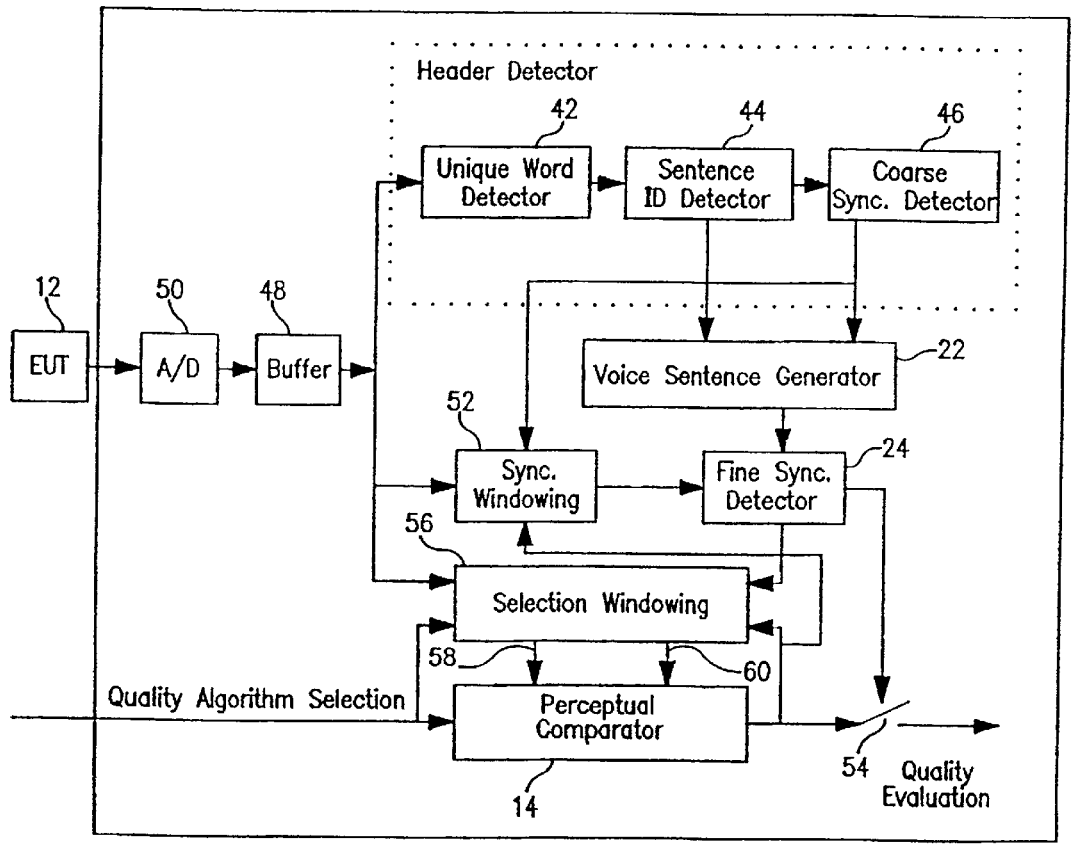
FIG. 3 is a diagram of another embodiment of a voice quality analyzer in accordance with the invention.

In one embodiment and referring to FIG. 3, sequencer 20 includes a unique word detector 42, a sentence ID detector 44, and a coarse sync detector 46, which include the functions of DTMF detector 18 of FIG. 1. Therefore, no separate DTMF detector 18 is shown in FIG. 3. When a unique word 32 is recognized by unique word detector 42, subsequently received data is passed to sentence ID detector 44. Sentence ID detector 44 detects sentence ID 34 that is received after the unique word. When sentence ID 34 is identified, it is passed to voice sentence generator 22 so that it can output the proper pre-stored representation of a voice test signal corresponding to a voice test signal identified by sentence ID 34, and subsequently received data is passed to coarse sync detector 46. Coarse sync detector 46 detects sync pulse 36 which, in one embodiment, is coded as a short DTMF pulse. When a coarse sync signal from coarse sync detector 46 is received, voice sentence generator 22 begins playback of a pre-stored representation of a voice signal corresponding to the determined sentence ID 34.

In one embodiment, the coarse synchronization provided by sync pulse 36 is not sufficient to enable signal comparator 14 to compare a voice test signal 38 to a pre-stored representation of a voice signal in real time, i.e., so that the quality evaluations performed by signal comparator 14 occur during receipt of voice test signals 38 with little or no apparent delay as perceived by a user. In one embodiment, coarse synchronization is not sufficient for analyzing voice test signals 38 using Perceptual Speech Quality Measure (PSQM), Measuring Normalizing Blocks (MNB), Perceptual Analysis Measurement System (PAMS), and Modified Bark Spectral Distortion (MBSD) measure algorithms. Therefore, a fine sync detector 24 is provided for more accurate synchronization. Fine sync detector 24 compares the output of voice sentence generator 22 with a window of voice data selected by sync windowing module 52. This comparison is performed, in one embodiment, in accordance with International Telecommunications Union (ITU) standard P.931, "Multimedia Communications Delay, Synchronization and Frame Rate Measurement." As a result of this comparison, outputs of fine sync detector 24 are produced to control a switch 54, which is closed when fine synchronization is achieved. Switch 54 prevents quality evaluations from being output before fine synchronization is achieved. In addition, data windows representing synchronized portions of a pre-stored representation of a voice test signal are output to a selection windowing module 56. Selection windowing module 56 selects a synchronized portion of the incoming voice test data 58 to compare to the synchronized portions of the pre-stored representation 60. The comparison is performed by perceptual comparator 14, and a quality evaluation is produced. The quality evaluation is output when switch 54 is closed, as indicated above.

FIG. 4 is a drawing of a representation of the windowing operation of sync window module 52 and selection windowing module 56 in one embodiment of the invention. A sync window 62 is selected from buffer 48 by sync window module 52. The start of sync window 62 and a selection window 64 selected by selection windowing module 56 are aligned. Buffer 48 is a circular buffer accepting digitized voice input. The position of sync window 62 is adjusted in accordance with quality measurements made by perceptual comparator 14, as indicated in FIG. 3. Alignment of selection window 64 with sync window 62 is accomplished, in this embodiment, by fine sync detector 24, including by selection of windowed data output from voice sentence generator 22.

In the embodiment represented by FIG. 3, selection windowing module 52 also applies a window function to at least one of the received voice data and the pre-stored representation of voice test signals for data weighting. In one embodiment, a plurality of weighting functions are provided, including rectangular weighting, as represented in FIG. 5, nonlinear emphasized weighting, an example of which is represented in FIG. 6, and discontinuous rectangular weighting, an example of which is represented in FIG. 7. The selection of the weighting function is preselected, through selection of a quality algorithm. The selection is also adaptively alterable, in accordance with a quality measurement from perceptual comparator 14 and as indicated in FIG. 3. Discontinuous rectangular weighting is used, for example, when disturbances such as hand-offs in a cellular system interfere with reception of voice signal data. In this case, in one embodiment, the algorithm used by perceptual comparator 14 excludes the disturbed periods from the quality evaluation. The occurrence and length of disturbed periods, in one embodiment, is reported separately from the quality measurement.

Figure 8:
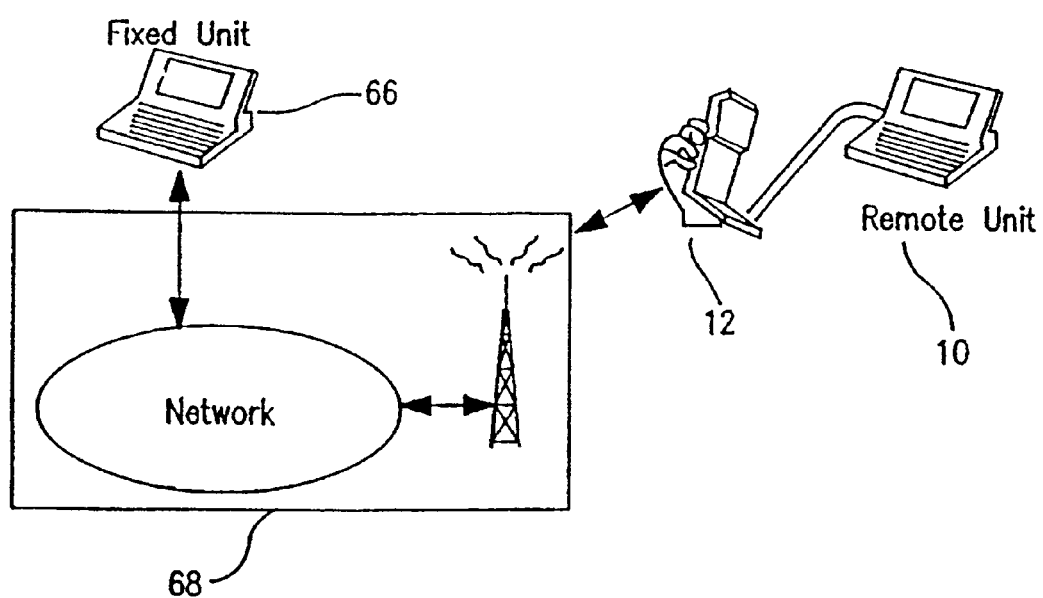
FIG. 8 is a block diagram of a test configuration in accordance with the invention.

An embodiment of a test configuration in accordance with the invention is shown in FIG. 8. It will be recognized that many or all of the functional elements in VQA 10 can be implemented in software or firmware in a computer as a design choice; accordingly, VQA 10 is shown as a computer in FIG. 8. VQA 10 is connected to an output port of VEUT 12, which, in one embodiment, is a cellular telephone 12 with a "hands-free" port. In this manner, quality test messages 30 received by cellular telephone 12 are transmitted to VQA 10 for analysis. Cellular telephone 12 receives quality test messages 30 from a message source 66, for example, via a network 68 such as a cellular wireless network. In one embodiment, message source 66 is configured as an answering machine with recorded quality test messages 30 stored in voice mailboxes. The recorded quality test messages 30 in the voice mailboxes are identified with sentence IDs 34. Voice test signals 38 stored in message source 66 are identified with sentence IDs 34 that identify corresponding pre-stored representations of voice test messages in voice sentence generator 22 of VQA 10.

Figure 9:
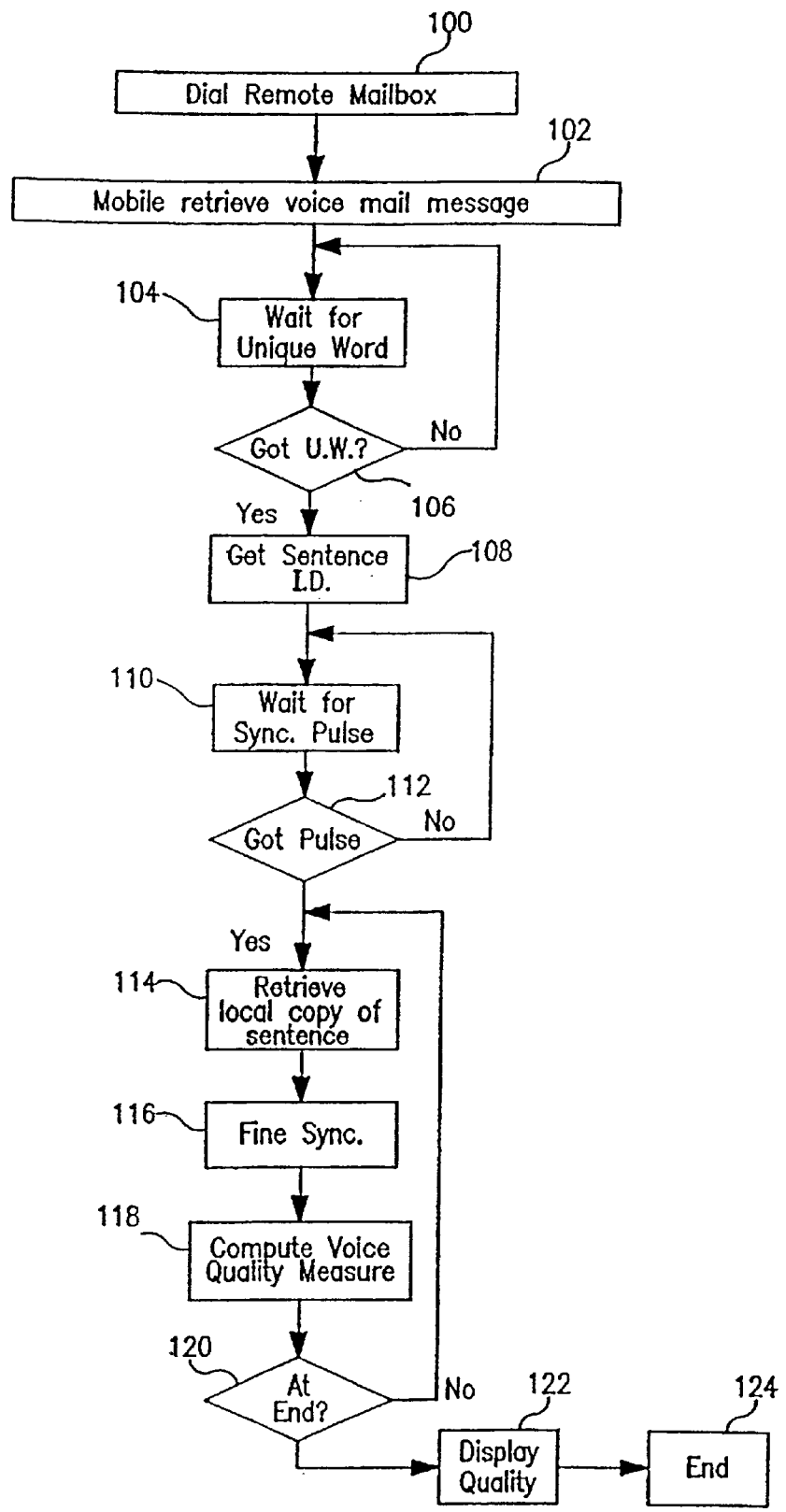
FIG. 9 is a flow chart of an embodiment of a test method in accordance with the invention.

In one embodiment and referring the FIG. 9, VEUT 12 dials 100 message source 66 via network 68 and retrieves 102 a voice mail message therefrom. The retrieved voice mail message is a quality test message 30. VQA 10 then waits 104, 106 until unique word 32 is recognized. Next, sentence ID 34 is obtained 108. VQA 10 then waits until sync pulse 36 is received 110, 112. When sync pulse 36 is received, a local copy of voice test signal 38 is retrieved 114, for example, from voice sentence generator 22. Fine synchronization 116 of the local copy of voice test signal 38 is then performed, and a voice quality measure is computed 118 until it is determined 120 that voice test signal 38 has ended. When voice test signal 38 has ended, the computed quality is displayed 122, and the end of the test is reached 124. In other embodiments, quality tests may be repeated manually or automatically.

Those skilled in the art will recognize that the invention described herein provide real-time perceptual quality measurement of voice signals. The invention is particularly suitable for performing such measurements utilizing algorithms that have previously not been known to be suitable for real-time measurements of signals. The invention is also particularly suited for providing real time perceptual quality measurements when a highly compressed voice signal is transmitted. Although embodiments described herein are applicable to quality measurements of voice signals, it will be recognized that the invention is also suitable for quality measurements of non-voice audio test signals as well. In these embodiments, voice quality analyzer 10 is thus, more generally, an audio quality analyzer (AQA), voice test signal 38 is an audio test signal, voice sentence generator 22 is an audio waveform generator (such as a digitized waveform generator), and the pre-stored representations of voice test signals in the audio waveform generator are pre-stored representations of audio test signals.

It will be evident to those skilled in the art that many other modifications are possible within the spirit of the invention. Therefore, the scope of the invention should be determined by reference to the claims appended below and their equivalents.

What is claimed is:

1. A method for providing real-time perceptual quality measurement of an audio signal, comprising:
    receiving a quality test signal, including receiving an audio test signal;
    coarsely synchronizing playback of a pre-stored representation of the audio test signal to the received audio test signal;
    finely synchronizing playback of the pre-stored representation of the audio test signal to the received audio test signal; and
    comparing a window of the received audio test signal to a portion of the finely synchronized playback of the pre-stored representation of the audio test signal to output a quality measurement of the received audio test signal.

2. A method in accordance with claim 1 wherein the quality test signal comprises a header signal including a synchronization pulse, and the step of coarsely synchronizing playback of the pre-stored representation of the audio test signal to the received audio test signal comprises synchronizing playback of the pre-stored representation of the audio test signal utilizing the synchronization pulse.

3. A method in accordance with claim 2 wherein finely synchronizing playback of the pre-stored representation of the audio test signal to the received audio test signal comprises the step of:
    comparing data in a windowed portion of the received audio test signal and a windowed portion of the pre-stored representation of the audio test signal; and
    adjusting an alignment of the windowed portions of the received audio test signal and a windowed portion of the pre-stored representation of the audio test signal in accordance with results of the comparison.

4. A method in accordance with claim 3 further comprising the step of receiving the header signal out-of-band.

5. A method in accordance with claim 3 further comprising the step of receiving the header signal in-band.

6. A method in accordance with claim 5 wherein the step of receiving the header signal comprises the step of receiving dual tone multiple frequency (DTMF) tones, and the step of coarsely synchronizing playback of the pre-stored representation of the audio test signal comprises synchronizing playback of the pre-stored representation of the audio test signal to a DTMF pulse.

7. A method in accordance with claim 3 wherein the audio test signal is a voice test signal, and the pre-stored representation of the audio test signal is a pre-stored representation of the voice test signal.

8. A method in accordance with claim 7 wherein and further comprising the steps of:
    receiving a sentence ID identifying the received voice test signal; and
    selecting the pre-stored representation of the voice test signal from a plurality of pre-stored representations in accordance with the received sentence ID.

9. A method in accordance with claim 8 wherein the step of receiving a sentence ID identifying the received voice signal comprises the step of receiving dual tone multiple frequency (DTMF) tones identifying the received voice signal.

10. A method in accordance with claim 3 wherein comparing a window of the received audio test signal to a portion of the finely synchronized playback of the pre-stored representation of the audio test signal to output a quality measurement of the received audio test signal comprises the step of generating a quality measurement in accordance with at least one quality measurement algorithm selected from the group of quality measurements consisting of ITU P.861 perceptual speech quality measurement (PSQM), modified normalized block (MNB), modified Bark spectral distortion (MSBD) measure, and perceptual analysis measurement system (PAMS).

11. A method in accordance with claim 10 further comprising the steps of:
    receiving a sentence ID in the header signal; and
    selecting a quality measurement algorithm for generating the quality measurement in accordance with the received sentence ID.

12. A method in accordance with claim 3 further comprising the steps of:
  receiving a unique word transmitted in the header signal; and
  verifying that the unique word was received before outputting a quality measurement of the received audio test signal.

13. A method in accordance with claim 12 wherein receiving a unique word comprises the step of receiving a dual tone multiple frequency (DTMF) signal representing a unique word.

14. A method in accordance with claim 1 further comprising applying a windowing function to a window of at least one of the window of the received audio test signal and a window of the finely synchronized pre-stored representation of the audio test signal prior to comparing the windowed portions to generate the quality measurement.

15. A method in accordance with claim 14 wherein the step of applying a windowing function comprises preselecting a windowing function.

16. A method in accordance with claim 15 wherein the step of applying a windowing function comprises adaptively selecting a windowing function.

17. An audio quality analyzer (AQA) to evaluate quality of a quality test signal received by equipment under test, the quality test signal comprising an audio test signal, said AQA configured to:
  coarsely synchronize playback of a pre-stored representation of the audio test signal to the received audio test signal;
  finely synchronize playback of said pre-stored representation of the audio test signal to the received audio test signal; and
  compare a window of the received audio test signal to a portion of the finely synchronized playback of the pre-stored representation of the audio test signal to output a quality measurement of the received audio test signal.

18. An AQA in accordance with claim 17 wherein the quality test signal comprises a synchronization pulse, and said AQA is configured to coarsely synchronize playback of the pre-stored representation of the audio test signal to the received audio test signal utilizing the synchronization pulse.

19. An AQA in accordance with claim 18 wherein said AQA is configured to:
  compare data in a windowed portion of the received audio test signal and a windowed portion of the pre-stored representation of the audio test signal; and
  adjust an alignment of the windowed portions of the received audio test signal and a windowed portion of the pre-stored representation of the audio test signal in accordance with results of the comparison.

20. An AQA in accordance with claim 19 further configured to receive the header signal out-of-band.

21. An AQA in accordance with claim 19 further configured to receive the header signal in-band.

22. An AQA in accordance with claim 21 further configured to receive dual tone multiple frequency (DTMF) signals as the header signal, and to coarsely synchronize playback of the pre-stored representation of the audio test signal to a DTMF pulse.

23. An AQA in accordance with claim 19 wherein the audio test signal is a voice test signal, and the pre-stored representation of the audio test signal is a pre-stored representation of a voice test signal.

24. An AQA in accordance with claim 23 further configured to:
  receive a sentence ID identifying the received voice test signal; and
  select the pre-store representation of the voice test signal from a plurality of pre-stored representations in accordance with the received sentence ID.

25. An AQA in accordance with claim 24 further configured to receive dual tone multiple frequency (DTMF) signals as the sentence ID.

26. An AQA in accordance with claim 19 configured to generate a quality measurement in accordance with at least one quality measurement algorithm selected from the group of quality measurement algorithms consisting of ITU P.861 perceptual speech quality measurement (PSQM), modified normalized block (MNB), modified Bark spectral distortion (MSBD) measure, and perceptual analysis measurement system (PAMS).

27. An AQA in accordance with claim 26 further configured to:
  receive a sentence ID in the header signal; and
  select a quality measurement algorithm for generating the quality measurement in accordance with the received sentence ID.

28. An AQA in accordance with claim 19 further configured to:
  receive a unique word transmitted in the header signal; and
  verify that the unique word was received before outputting a quality measurement of the received audio test signal.

29. An AQA in accordance with claim 28 further configured to receive a dual tone multiple frequency (DTMF) signal representing the unique word.

30. An AQA in accordance with claim 19 further configured to apply a windowing function to a window of at least one of the windowed portion of the received audio test signal and a windowed portion of the finely synchronized pre-stored representation of the audio test signal prior to comparing them to generate the quality measurement of the received audio test signal.

31. An AQA in accordance with claim 30 further configured to apply a preselected windowing function.

32. An AQA in accordance with claim 31 further configured to adaptively apply a windowing function.

* * * * *